United States Patent [19]

Ohsaki

[11] Patent Number: 5,168,859

[45] Date of Patent: Dec. 8, 1992

[54] METHOD AND APPARATUS FOR JUDGING MISFIRE IN INTERNAL COMBUSTION ENGINE

[75] Inventor: Masanobu Ohsaki, Isesaki, Japan

[73] Assignee: Japan Electronic Control Systems Co., Ltd., Isesaki, Japan

[21] Appl. No.: 646,722

[22] PCT Filed: May 29, 1990

[86] PCT No.: PCT/JP90/00693

§ 371 Date: Jan. 29, 1991

§ 102(e) Date: Jan. 29, 1991

[30] Foreign Application Priority Data

May 29, 1989 [JP] Japan ................................ 1-60913

[51] Int. Cl.⁵ .......................................... F02D 41/22
[52] U.S. Cl. ................................. 123/679; 123/680; 123/681; 123/686; 73/116
[58] Field of Search ............... 123/440, 479, 489, 589; 73/116

[56] References Cited

U.S. PATENT DOCUMENTS

| | | | |
|---|---|---|---|
| 4,006,718 | 2/1977 | Konomi | 123/440 |
| 4,365,603 | 12/1982 | Shikata et al. | 123/440 |
| 4,445,326 | 5/1984 | Lyon | 123/589 |
| 4,825,838 | 5/1989 | Osuga et al. | 123/440 |

FOREIGN PATENT DOCUMENTS

| | | | |
|---|---|---|---|
| 53-131310 | 11/1978 | Japan . | |
| 56-23550 | 3/1981 | Japan . | |
| 60-45750 | 3/1985 | Japan . | |
| 61-106944 | 5/1986 | Japan . | |
| 61-107131 | 5/1986 | Japan . | |
| 62-159744 | 7/1987 | Japan . | |
| 63-1739 | 1/1988 | Japan . | |
| 63-263241 | 10/1988 | Japan | 123/440 |

*Primary Examiner*—Andrew M. Dolinar
*Attorney, Agent, or Firm*—Foley & Lardner

[57] ABSTRACT

In an internal combustion engine where in a predetermined driving state, the air-fuel ratio is feedback-controlled based on a detection signal of an air-fuel ratio sensor and in other driving state, the air-fuel ratio is feed-forward-controlled, the presence or absence of a misfire is judged from the detection signal of the air-fuel sensor at the time of the feed forward control, and when the presence of a misfire is judged, a warning is given.

12 Claims, 4 Drawing Sheets

METHOD AND APPARATUS FOR JUDGING MISFIRE IN INTERNAL COMBUSTION ENGINE

TECHNICAL FIELD

The present invention relates to a method and apparatus for judging a misfire in an internal combustion engine. More particularly, the present invention relates to a method and apparatus in which a misfire in an engine is judged from a detection signal of an air-fuel ratio sensor and a driver is warned of occurrence of a misfire.

BACKGROUND ART

In an air-fuel ratio control apparatus of an internal combustion engine, a fuel injection quantity is generally computed based on a sucked air flow quantity detected by an air flow meter and an engine revolution number detected from an ignition signal of an ignition coil, and the computed value is appropriately corrected and an electromagnetic fuel injection valve is driven to supply an optimum quantity of fuel to the engine.

More specifically, in a low-speed/low-load to medium-speed/medium-load driving region, an actual air-fuel ratio is detected from the oxygen concentration in the exhaust gas by an oxygen sensor attached to an exhaust manifold, and the above-mentioned fuel injection quantity is corrected and the feedback control is performed so that the air-fuel ratio is controlled to the theoretical air-fuel ratio (target air-fuel ratio).

Furthermore, at the time of start, idle driving or low water temperature driving or in a predetermined high-speed/high-load driving region, the feedback control of the air-fuel ratio is stopped, but the air-fuel ratio is feed-forward-controlled to the target air-fuel ratio.

If a misfire takes place in the engine, an unburnt fuel is discharged into an exhaust passage to cause deterioration of a catalyst, and especially, if a misfire continues for several seconds in the high-speed/high-load driving region, it is apprehended that the catalyst temperature will rise above 900° C. In this state, damage to the catalyst is brought about.

According to the automobile standards instituted in the state of California, U.S.A., it is stipulated that when a trouble (mishap or deterioration) occurs in parts such as a fuel injection valve, an oxygen sensor and a catalyst device, if the trouble does not appear in the exhaust gas or drivability, this trouble should be made known in some form, though it is not necessary when a user can grasp the trouble as a phenomenon.

Under this background, the present invention has been completed, and it is an object of the present invention to provide a method an apparatus for judging a misfire with high accuracy without disposing any particular sensor even if the misfire does not appear in the exhaust gas or drivability.

DISCLOSURE OF THE INVENTION

According to the present invention, in an internal combustion engine which comprises means for feedback-correcting the fuel supply quantity in a predetermined driving state so that the detected actual air-fuel ratio is controlled to a target air-fuel ratio, and means for feed-forward-correcting the fuel supply quantity in other driving state so that the actual air-fuel ratio is controlled to a target air-fuel ratio, this object can be attained by a method for judging a misfire wherein while the feedback correction is practiced, the presence or absence of a misfire is judged from the detected actual air-fuel ratio, and when the presence of a misfire is judged, a warning is given.

Furthermore, according to the present invention, in an internal combustion engine which comprises fuel supply quantity-setting means for setting the fuel supply quantity according to the engine driving state, air-fuel ratio-detecting means for detecting the actual air-fuel ratio from an exhaust component, feedback correction means for performing the feedback correction of the fuel supply quantity in a predetermined driving state based on a detection signal of the air-fuel ratio-detecting means so that the actual air-fuel ratio is controlled to a target air-fuel ratio, feed forward correction means for performing the feed forward correction of the fuel supply quantity in other driving state so that the actual air-fuel ratio is controlled to a predetermined target air-fuel ratio, and driving control means for driving and controlling fuel-supplying means according to the corrected fuel supply quantity, there is provided an apparatus for judging a misfire which comprises at least misfire-judging means for judging the presence or absence of a misfire in the engine from the detection signal of the air-fuel ratio-detecting means when the feed forward correction means is operated, and operating means for actuating warning means when the presence of a misfire is judged.

As specific examples of the driving state where the feed forward control is performed, there can be mentioned a driving state in a high-speed/high-load driving region, a driving state at the time of start, an idle driving state and a driving state at a low water temperature.

In the above-mentioned structure, during the stop of the feedback control of the air-fuel ratio (during the feed forward control), the presence or absence of a misfire is judged from a detection signal of the air-fuel ratio-detecting means which is used only during the feedback control of the air-fuel ratio and a warning is given when the presence of a misfire is judged, whereby deterioration of a catalyst is controlled.

EMBODIMENT OF THE INVENTION

The present invention will now be described in detail with reference to the accompanying drawings.

Figure 1:
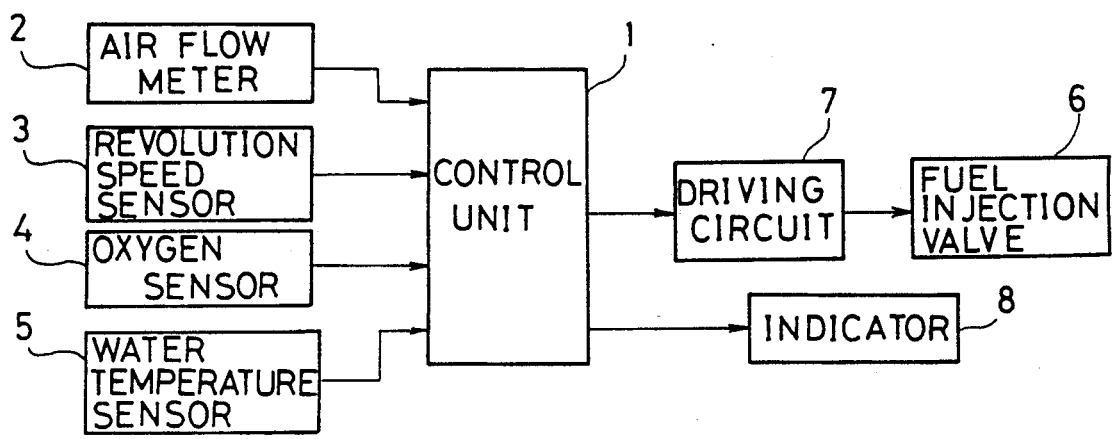
FIG. 1 illustrates the structure of one embodiment of the present invention.

Referring to FIG. 1, a sucked air flow quantity Q detected by an air flow meter, an engine revolution number N detected by a revolution speed sensor 3, a signal of oxygen concentration in the exhaust gas detected by an oxygen sensor 4 as the air-fuel ratio-detecting means and a detection signal of the water temperature detected by a water temperature sensor 5 are inputted into a control unit 1 comprising a microcomputer and the like.

Figure 2:
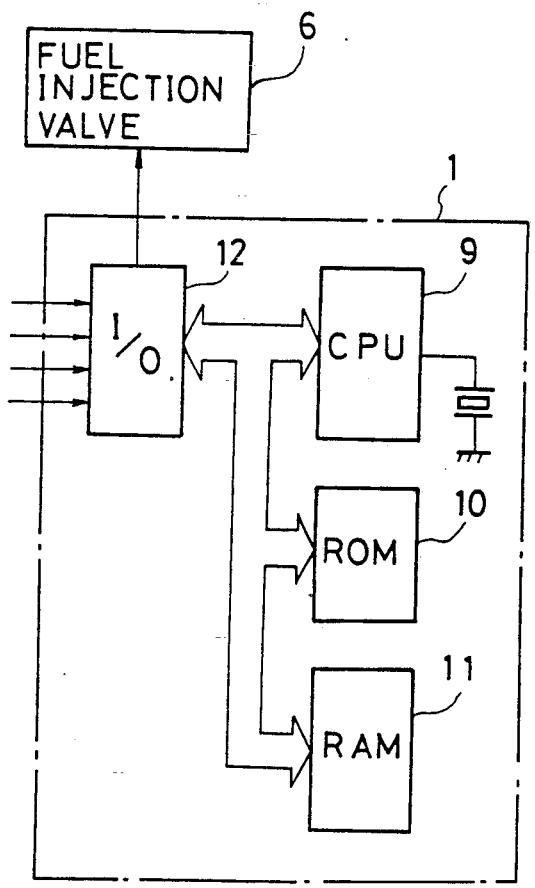
FIG. 2 illustrates the hardware structure of the above embodiment.

As shown in FIG. 2, the control unit 1 comprises CPU 6, RAM 8 and I/O interface 9. CPU 6 reads in necessary external data from I/O interface 9 according to the program written in ROM 7, performs delivery of data between CPU 6 and RAM 8, computes values necessary for calculation of parameters relative to the fuel injection quantity and outputs processed data to I/O interface 9 according to need.

The control unit 1 outputs an injection pulse signal corresponding to the fuel injection quantity set according to the driving state of the engine to a fuel injection valve 6 as the fuel-supplying means through a driving circuit 7. The control unit 1 operates according to the flow chart of FIG. 2, and the control unit 1 judges the presence or absence of a misfire based on the input voltage from the oxygen sensor 4 and displays the result of the judgement on an indicator 8 as the warning means.

Figure 3:
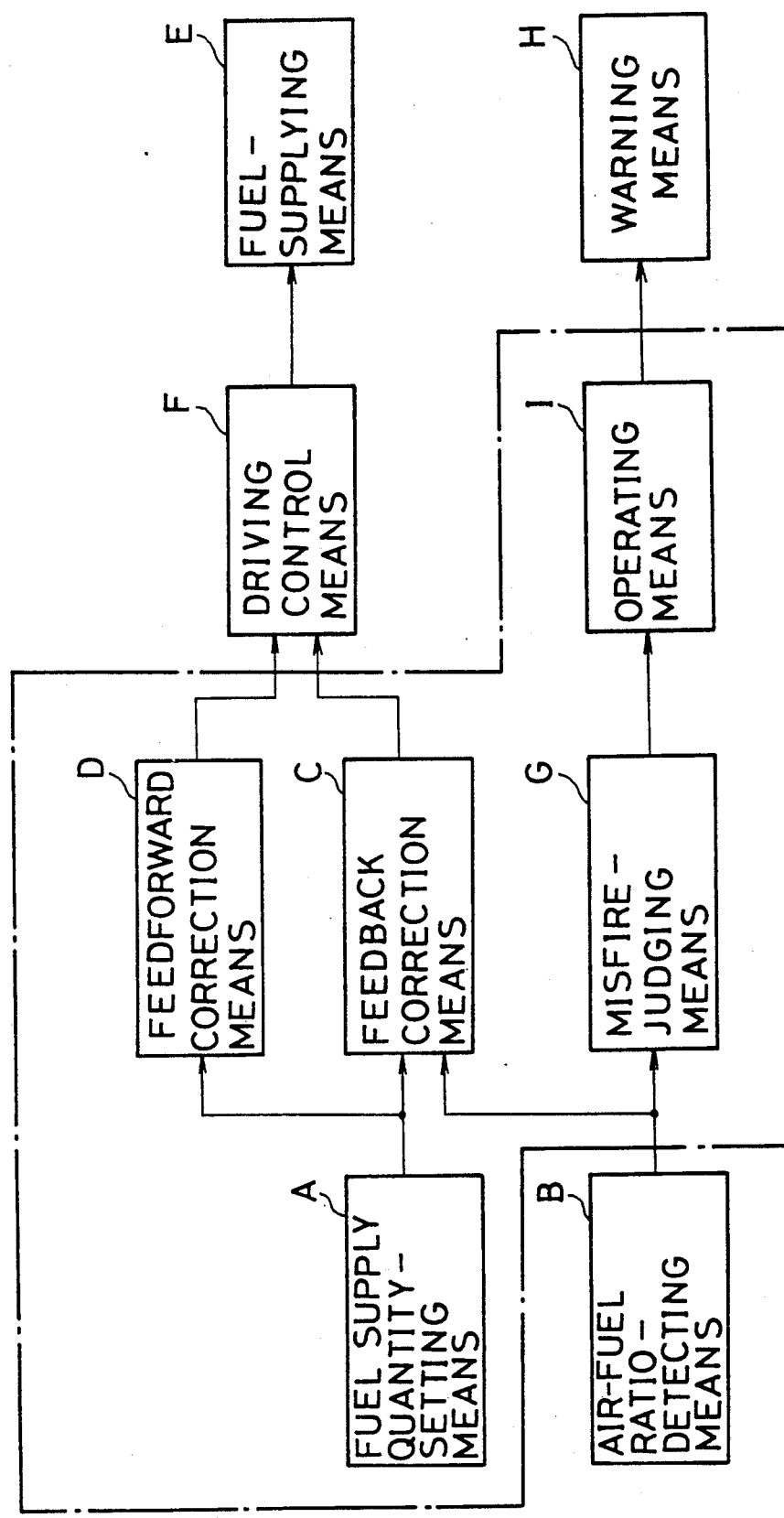
FIG. 3 is a functional block diagram illustrating the structure of the present invention.
Figure 4:
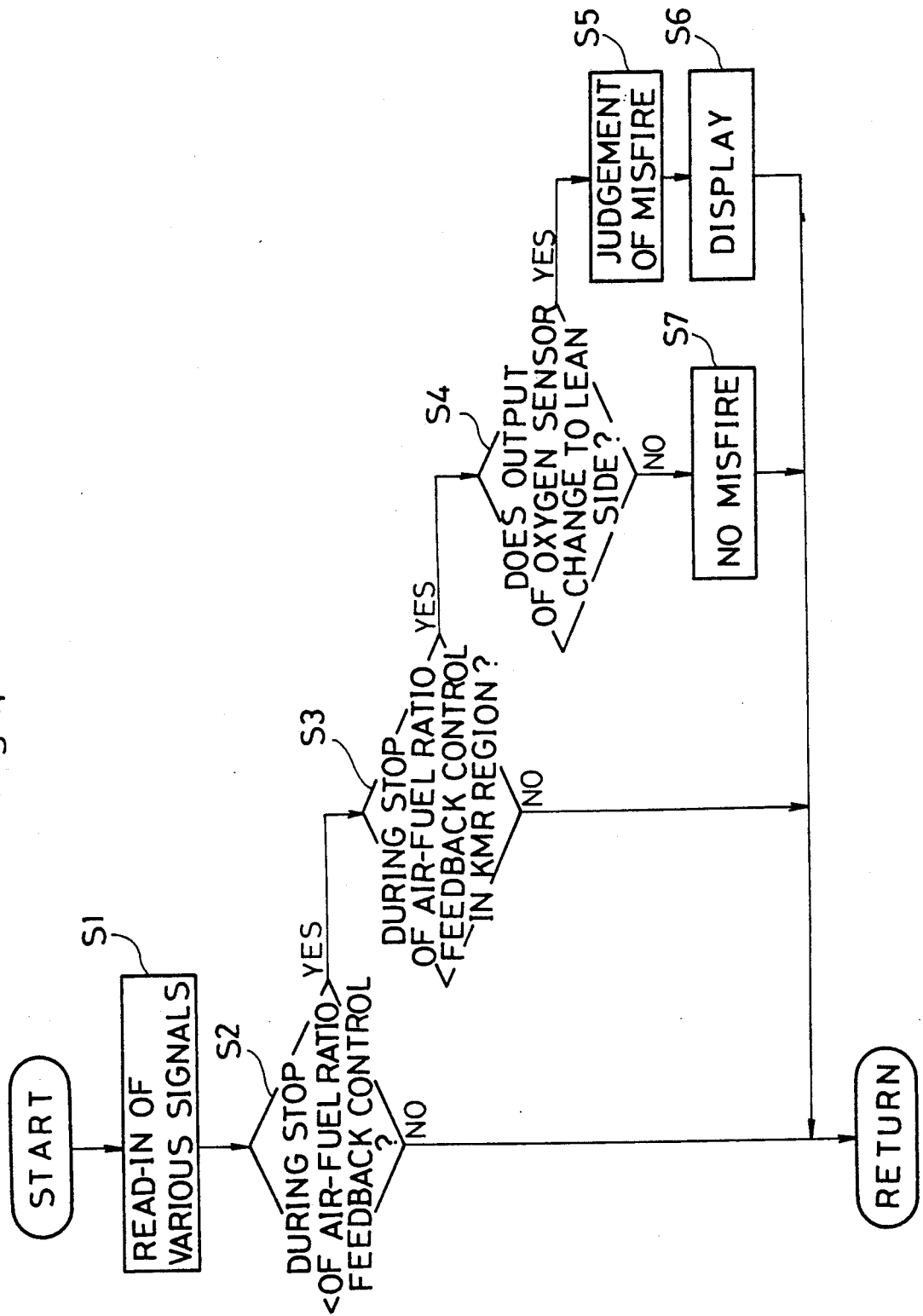
FIG. 4 is a flow chart of the above-mentioned embodiment.
Figure 5:
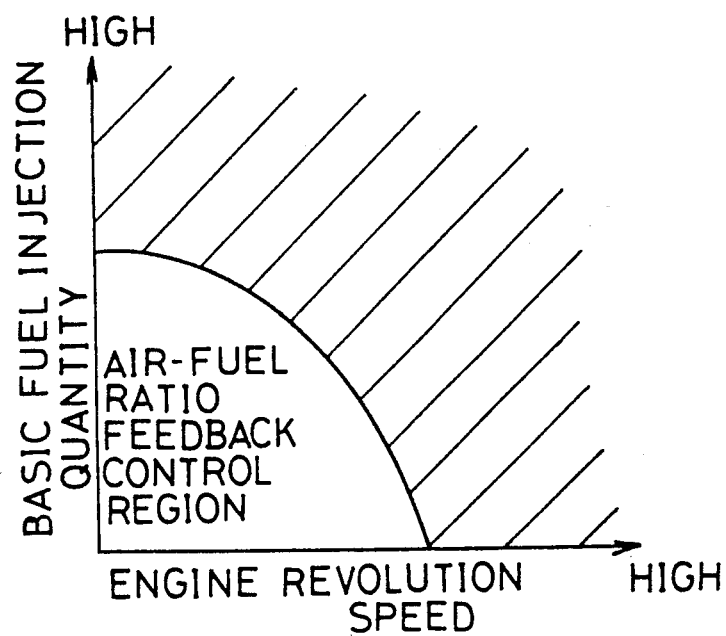
FIGS. 5 and 6 are diagrams illustrating functions of the above-mentioned embodiment.
Figure 6:
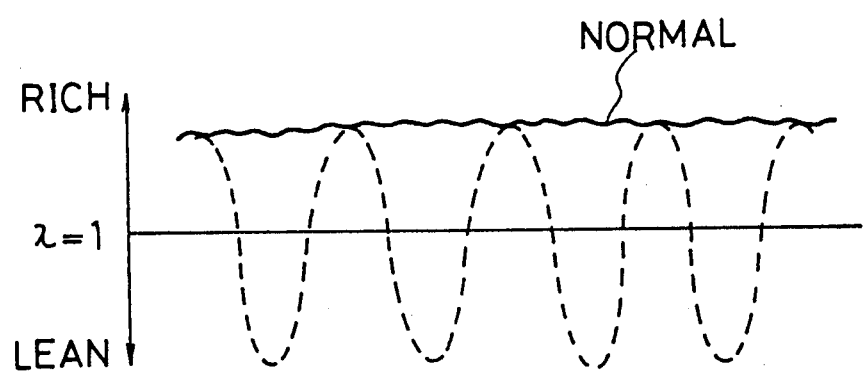

The control unit 1 (CPU 9) constitutes, as shown in FIG. 3, fuel supply quantity-setting means, feedback correction means, feed forward correction means, misfire-judging means and operating means, and an example is illustrated in FIGS. 4 through 6. Moreover, driving control means is constructed by the control unit 1 and driving circuit 7.

The operation will now be described with reference to the flow chart of FIG. 4.

The control of the fuel injection is first described. The basic fuel injection quantity Tp ($=KQ/N$; K is a constant) is calculated from the sucked air flow quantity Q detected by the air flow meter 2 and the engine revolution number N detected by the revolution speed sensor 3, and the fuel injection quantity Ti ($=Tp \times COEF \times \alpha + Ts$; Ts represents a voltage correction portion by the battery voltage) is calculated from the basic fuel injection quantity, various correction coefficients represented by the water temperature and the air-fuel ratio feedback correction coefficient $\alpha$ based on the output voltage of the oxygen sensor 5. Then, an injection pulse signal corresponding to the computed fuel injection quantity Ti is outputted into a fuel injection valve 7 through a driving circuit 8 to effect the control of the fuel injection, whereby, as shown in FIG. 4, in a low-speed/low-load to medium-speed/medium-load driving region, the feedback control of the air-fuel ratio is performed while changing the air-fuel feedback correction coefficient $\alpha$ so that the actual air-fuel ratio detected by the oxygen sensor 5 is controlled to the theoretical air-fuel ratio ($\lambda = 1$).

In the high-speed/high-load driving region (the hatched region in FIG. 5; hereinafter referred to as "KMR region"), the above-mentioned air-fuel ratio feedback control is stopped, and by the feed forward control, the air-fuel ratio feedback correction coefficient $\alpha$ is clamped and controlled to a predetermined value so that the actual air-fuel ratio is maintained at a target air-fuel ratio slightly richer than the level of $\lambda = 1$ (see Japanese Unexamined Patent Publication No. 61-106944).

During this fuel injection control, the routine shown in the flow chart of FIG. 4 is practiced.

More specifically, at step S1, various signals from the oxygen sensor and the like are read into the routine.

At step S2, it is judged whether or not the feedback control of the air-fuel ratio is now stopped. In case of YES, the routine goes into step S3, and in case of NO, that is, during the feedback control of the air-fuel ratio, the routine is ended.

At step S3, it is judged whether or not the air-fuel ratio feedback control in the KMR region is stopped, and in case of YES, the routine goes into step S4 and in case of NO, the routine is ended.

At step S4, it is judged whether or not the output voltage of the oxygen sensor has changed to the lean side at a predetermined frequency within a predetermined time, and in case of YES, the routine goes into step S5 and in case of NO, the routine goes into step S7.

At step S5, occurrence of a misfire is judged, and at step S6, the occurrence is displayed on the indicator.

At step S7, it is judged that a misfire does not occur and the routine is ended.

The air-fuel ratio control in the KMR region is performed so that the actual air-fuel ratio is maintained at an air-fuel ratio slightly richer than the level of $\lambda = 1$, and therefore, when a misfire is not caused, the output voltage of the oxygen sensor 5 is maintained at a substantially constant level on the side richer than the level of $\lambda = 1$, as indicated by the solid line in FIG. 6. In contrast, if a misfire is caused to occur, since the quantity of oxygen in the exhaust gas increases, the output voltage of the oxygen sensor 5 greatly changes toward the lean side, as indicated by the broken line in FIG. 6. Accordingly, if the judgement of the misfire is made in the KMR region, occurrence of such a misfire as does not appear in the drivability or the properties of the exhaust gas can be assuredly judged. Thus, deterioration of the catalyst can be controlled without disposing any particular sensor.

Incidentally, also in the case where the air-fuel ratio at the time of start, the idle driving or the time of a low water temperature is feed-forward-controlled, occurrence of a misfire can be judged from the output voltage of the oxygen sensor 5. In this case, occurrence of a misfire can be judged over the entire driving region.

Furthermore, an arrangement can be made so that the basic fuel injection quantity is determined from the opening degree of a throttle valve and the revolution number of the engine.

As is apparent from the foregoing description, according to the present invention, the presence or absence of a misfire is judged from the detection signal of the air-fuel ratio-detecting means during the stop of the feedback control of the air-fuel ratio and a warning is given. Accordingly, even a misfire which does not appear in the drivability or the like can be judged accurately without disposing any particular sensor and the deterioration of the catalyst is hence controlled.

INDUSTRIAL APPLICATION FIELD

As is apparent from the foregoing description, the misfire-judging apparatus of the present invention is effective for judging a misfire at a high precision without disposing any particular sensor in the system where the air-fuel ratio is feed-forward-controlled in a predetermined driving state.

What is claimed is:

1. A method for determining a misfire in an internal combustion engine where in a predetermined driving state, a fuel injection quantity is feedback-corrected so that an air-fuel ratio is controlled to a first target air-fuel ratio, comprising the steps of:

feed-forward-correcting the fuel injection quantity in another driving state, so that the air-fuel ratio is controlled to a second target air-fuel ratio;

determining the presence or absence of a misfire from the detected actual air-fuel ratio in the other driving state; and issuing a warning when the presence of a misfire is determined.

2. A method for determining a misfire in an internal combustion engine according to claim 1, wherein the predetermined driving state is that of a low-speed/low-load to medium-speed/medium-load driving region.

3. A method for determining a misfire in an internal combustion engine according to claim 1, wherein the other driving state covers a high-load driving region and a high-speed driving region.

4. A method for determining a misfire in an internal combustion engine according to claim 1, wherein the other driving state is that of driving at a time of start.

5. A method for determining a misfire in an internal combustion engine according to claim 1, wherein the other driving state is that of an idle driving state.

6. A method for determining a misfire in an internal combustion engine according to claim 1, wherein the other driving state is that of driving at a low water temperature.

7. An apparatus for determining a misfire in an internal combustion engine comprising:
fuel supply quantity-setting means for setting a fuel supply quantity according to an engine driving state;
air-fuel ratio-detecting means for detecting an air-fuel ratio from an exhaust component;
feedback correction means for performing feedback correction of the fuel supply quantity in a predetermined driving state based on a detection signal of the air-fuel ratio-detecting means so that the air-fuel ratio is controlled to a first target air-fuel ratio;
feed forward correction means for performing feed forward correction of the fuel supply quantity in another driving state so that the air-fuel ratio is controlled to a second target air-fuel ratio;
driving control means for driving and controlling fuel-supplying means according to the corrected fuel supply quantity;
misfire-determining means for determining the presence or absence of a misfire in the engine from the detection signal of the air-fuel ratio-detecting means when the feed forward correction means is operated; and
means for actuating a warning when a misfire is determined.

8. An apparatus for determining a misfire in an internal combustion engine according to claim 7, which further comprises means for actuating the feedback correction means in a low-speed/low-load to medium-speed/medium-load driving region.

9. An apparatus for determining a misfire in an internal combustion engine according to claim 7, which further comprises means for actuating the feed forward correction means in a high-load driving region and a high-speed driving region.

10. An apparatus for determining a misfire in an internal combustion engine according to claim 7, which further comprises means for actuating the feed forward correction means at the time of start.

11. An apparatus for determining a misfire in an internal combustion engine according to claim 7, which further comprises means for actuating the feed forward correction means at the time of idle driving state.

12. An apparatus for determining a misfire in an internal combustion engine according to claim 7, which further comprises means for actuating the feed forward correction means at the time of driving at a low water temperature.

* * * * *